N. G. COPLEY.
GAGE COCK.
APPLICATION FILED AUG. 30, 1911.

1,034,085.

Patented July 30, 1912.

Witnesses:
A. L. Lord
Brennan B. West

Inventor.
Norbert G. Copley,
By Albert H. Bates,
Atty.

UNITED STATES PATENT OFFICE.

NOIBERTO G. COPLEY, OF FOSTORIA, OHIO.

GAGE-COCK.

1,034,085.   Specification of Letters Patent.   Patented July 30, 1912.

Application filed August 30, 1911. Serial No. 646,924.

*To all whom it may concern:*

Be it known that I, NOIBERTO G. COPLEY, a citizen of the United States, residing at Fostoria, in the county of Seneca and State of Ohio, have invented a certain new and useful Improvement in Gage-Cocks, of which the following is a full, clear, and exact description, reference being had to the accompanying drawings.

The object of this invention is to provide a very simple, effective and durable gage cock for indicating the water level in steam boilers.

A peculiar characteristic of my gage cock is that there is no valve, and, as a result of this, I save leakage and do away with the necessity for the periodic regrinding or renewing of parts which is inherent in the ordinary valved cock.

In accomplishing the desired result, I provide a movable tubular member closed at its inner end and adapted to extend from outside the boiler through a stuffing box into a space communicating with the interior of the boiler. This tubular body has an external outlet and has an entrance orifice which is normally on the outer side of the packing in the stuffing box. When the tubular body is shoved inward, the orifice comes into communication with the water or steam and allows it to escape through the bore and the exit opening, thus indicating the condition at that level. A bracket secured on the stuffing box casing is arranged to guide the tubular body and also to provide a support for a lever which is adapted to shove the tubular body inward, while a spring is provided for insuring its outward return.

My invention may be conveniently summarized as consisting of the means above referred to, and hereinafter more fully described, by which I accomplish the desired result.

Figure 1:
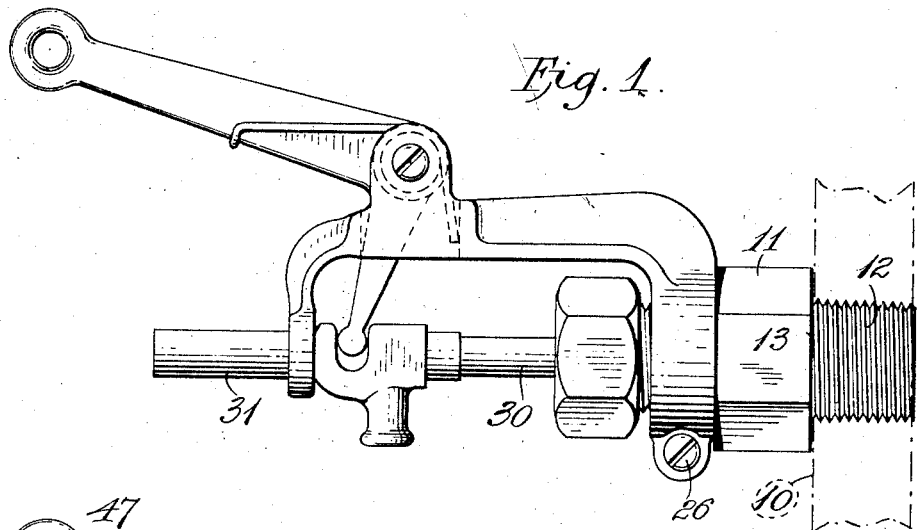
Figure 2:
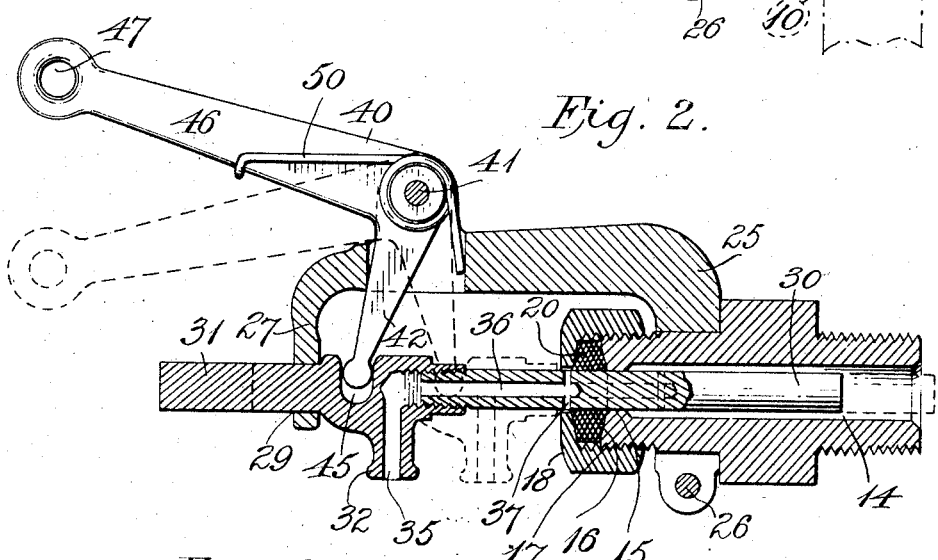
Figure 3:
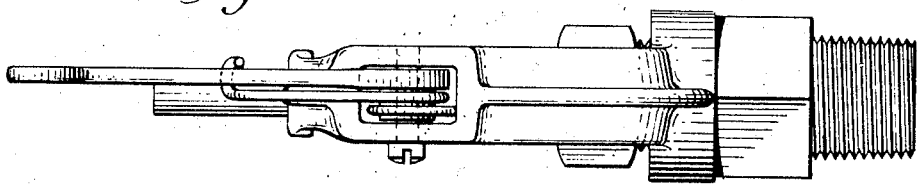

In the drawings, Figure 1 is a side elevation of my gage cock; Fig. 2 is a vertical longitudinal section of the same, and Fig. 3 is a plan.

Referring to the parts by reference numerals, 10 indicates a portion of the shell of a boiler or water column and 11 a nipple secured thereinto, this nipple having a usual thread 12 and an angular or nut-like portion 13, by which it may be turned. The nipple has a tubular bore 14, which is reduced near the outer end, as shown at 15. The extreme outer end of the nipple is preferably countersunk, as shown at 16. On the outer side of this outer end portion are provided threads 17. Screwing onto these threads is a suitable cap 18, preferably countersunk opposite to the seat 16 and between the two seats thus provided is a suitable packing 20,—the nipple, cap and packing thus constituting a stuffing box.

Mounted on the body of the nipple 11 between the nut 13 thereon and the stuffing-box-cap is a bracket 25. This bracket embraces the nipple and is clamped by a suitable screw 26 passing through ears of the bracket. The bracket extends outwardly approximately substantially parallel with the axis of the bore and at its outer end has a projecting portion 27, which has an aperture 29 alining with the bore of the nipple. Slidably mounted in the stuffing box and in the aperture 29 is a partially tubular plunger which may open or close communication with the interior of the boiler, and which will now be described.

The slidable, tubular member or plunger above referred to is conveniently made into two pieces 30 and 31 rigidly secured together. As shown, the piece 30 is a round bar of metal closed at its inner end and screw threaded at its outer end into a seat in the inner end of the piece 31. The piece 31 has a lateral extension 32 adjacent to its inner end and through this extension is a bore 35 communicating with a bore 36 in the outer portion of the part 30. One or more admission openings 37 are provided through the wall of the bar 30 into the inner end of the bore 36. By forming the plunger of the two parts described, it may be constructed economically.

With the parts as shown in the drawings, any escape of water or steam from the boiler is prevented by the packing about the bar 30. If, however, the tubular member be shoved inward to carry the openings 37 inside of the reduced bore 15, an exit for water or steam is immediately provided through that opening and through the bores 36 and 35, thus indicating the condition of steam or water at that level.

To efficiently operate the plunger I provide a suitable bell crank lever 40. This lever is pivoted at 41 to ears on the bracket 25 and its short arm 42 projects downwardly through an opening 43 in that bracket into a seat 45 in the outer member of the plunger. The long arm 46 of the bell crank may be provided at its end with an eye 47 for the attachment of an operating chain or wire.

50 indicates a spring which is coiled around the stud 41 and has one arm bearing against the bracket and the other arm against the under side of the bell crank arm 46, thus tending to maintain the parts in the position shown in the drawings.

When the gage cock is in place, the parts are normally held by the spring so that exit from the boiler is prevented. A simple downward pull on the long arm of the bell crank forces the plunger inward until the passageway through it is brought into communication with the boiler, allowing the escape of fluid from the boiler.

It will be seen that my device is not only very simple in construction, but is positive and certain in operation. Moreover, it is self-cleaning and cannot clog from scale or material in the boiler. By being packed with a metallic packing, which does not need renewal, the device is permanent and durable in every particular. The bell crank gives great convenience of operation, and the spring insures proper return of the parts.

Having thus described my invention, what I claim is:—

1. In a device of the character described, the combination of a nipple, a bracket carried thereby, a tubular plunger slidable in the nipple and guided by the bracket, said plunger having two separable parts, one slidable in the bore, and the other having a screw threaded connection with the first mentioned part and a lateral opening communicating with the interior of the other member, the member with the lateral opening having an extension engaged by the bracket, and an operating lever carried by the bracket and engaging such member.

2. In a gage cock, the combination of a nipple having a bore, a cap screw-threaded onto the outer end of the nipple, a bracket embracing the nipple on the inner side of said cap, said bracket extending outwardly and being provided with an eye, a movable plunger occupying the bore and said eye, said plunger having closed inner and outer ends and having an intermediate bore with an entrance opening through the wall of the plunger and an exit opening, and a bell crank pivoted to the bracket and having an arm engaging the plunger between the bracket and cap.

3. In a gage cock, the combination of a nipple having an external thread and an angular exterior whereby it may be secured in place, a cap screw-threaded on the outer end of the nipple, packing between the outer end of the nipple and the inner face of the cap, a bracket clamped about the body of the nipple between the angular exterior and the cap and extending outwardly and provided with an eye alining with the opening through the cap, a plunger slidably mounted in said eye and in the stuffing box provided by the nipple, cap and packing, said plunger having a central bore, an opening adjacent to the stuffing box through the wall of the plunger into the bore, a discharge nipple having an opening communicating with the other end of the bore, a bell crank lever pivoted to said bracket and having an arm occupying a seat in the plunger, and a spring acting on said bell crank lever and tending to hold it with the plunger in the outermost position.

4. In a gage cock, the combination of a nipple having an external thread at its inner end, a cap screw-threaded on the outer end of the nipple, packing between the outer end of the nipple and the inner face of the cap, a bracket clamped about the body of the nipple and provided with an eye alining with the opening through the cap, a plunger having an inner member slidably mounted in the packing and a connected outer member slidably mounted in said eye, said plunger having communicating bores in its two parts, there being an opening adjacent to the stuffing box through the wall of the inner part of the plunger into the bore, a discharge nipple on the outer part of the plunger having an opening communicating with the other end of the bore, a bell crank pivoted to said bracket and having an arm occupying a seat in the outer part of the plunger, and a spring bearing against the bracket and bell crank and acting on said bell crank to hold it normally with the plunger in the outermost position.

In testimony whereof, I hereunto affix my signature in the presence of two witnesses.

NOIBERTO G. COPLEY.

Witnesses:
E. A. ROGERS,
M. M. PLEIS.